W. L. R. EMMET.
APPARATUS FOR UTILIZING SOLAR HEAT.
APPLICATION FILED JUNE 1, 1909.

980,505.

Patented Jan. 3, 1911.

Witnesses:

Inventor:
William L. R. Emmet,
by Albert G. Davis
Att'y

W. L. R. EMMET.
APPARATUS FOR UTILIZING SOLAR HEAT.
APPLICATION FILED JUNE 1, 1909.

980,505.

Patented Jan. 3, 1911.

Witnesses:

Inventor:
William L. R. Emmet,
by Albert G. Davis
Att'y.

W. L. R. EMMET.
APPARATUS FOR UTILIZING SOLAR HEAT.
APPLICATION FILED JUNE 1, 1909.

980,505.

Patented Jan. 3, 1911.
4 SHEETS—SHEET 3.

Witnesses:

Inventor:
William L. R. Emmet,
by
Att'y.

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

APPARATUS FOR UTILIZING SOLAR HEAT.

980,505.                    Specification of Letters Patent.    Patented Jan. 3, 1911.

Application filed June 1, 1909. Serial No. 499,445.

*To all whom it may concern:*

Be it known that I, WILLIAM L. R. EMMET, a citizen of the United States, residing in Schenectady, in the county of Schenectady, State of New York, have invented certain new and useful Improvements in Apparatus for Utilizing Solar Heat, of which the following is a specification.

The rays of the sun deliver to every part of the earth's surface a large amount of energy, amounting in many cases to more than one watt per square inch of surface directly exposed. Under ordinary conditions bodies heated by the sun simply rise to a temperature where cooling, by radiation, conduction and convection, balances the heat received. Thus under ordinary conditions it is impossible to impart any high degree of temperature because the heat dissipated soon balances that received.

To convert heat into energy efficiently it is necessary to operate through considerable range of temperature, since the efficiency of any thermo-dynamic cycle is virtually proportional to the temperature range. Thus if a certain number of heat units can be utilized in making steam or other useful vapor, the power obtainable from the steam will depend upon the temperature through which it is worked, and will be larger as the range of temperature is increased. From this it follows that any method of heating liquid or gas for the purpose of producing power must depend for its efficiency upon the degree of temperature that can effectively be produced.

The object of my invention is to provide an apparatus which will effectively utilize solar heat over a relatively large range of temperature, and in which the losses due to radiation, conduction and convection are reduced to a minimum. The problem here presented then is to deliver as much heat as possible to the vessel containing the fluid, and to restrict as fully as possible the escape of heat therefrom. Hence the more nearly perfect are the results in these directions, the greater will be the efficiency of the apparatus as a whole.

Stated generally, my invention comprises, in its practical embodiment, one or more vessels of suitable shape and size which is or are heated externally by the sun's rays. Water or other fluid or gas is delivered to the vessel under the necessary pressure, and after being heated is discharged for application either in the form of heat or power. The fluid thus delivered may be utilized for industrial purposes in any known way. The vessel is provided with an inclosure which freely admits the sun's rays but restricts as completely as possible the dissipation of heat from the vessel itself. Stated more specifically, the arrangement of the inclosure is such that paths by which heat or radiation can escape from the vessel heated are intercepted by vacuum chambers or by a single vacuum chamber which wholly or in part surrounds the vessel. These chambers, owing to their lack of internal atmosphere, cut off the escape of heat by conduction and convection and when internally silvered to render them reflecting also largely cut off loss by radiation from the vessel. The radiant energy received can be admitted without passing it through the walls of one of these vacuum chambers but it is preferred to admit it through portions of such walls which are made transparent for the purpose.

In carrying out my invention one or a number of vessels are provided, preferably a number, of any suitable shape and size, that are sufficiently strong to withstand the pressure of the vapor to be generated. The most convenient way to carry out the invention is to make a boiler that comprises a series of tubes placed side-by-side with a suitable space between and connect corresponding ends to a chambered header so that fluid can flow into and out of the tubes absorbing heat as it goes. I can advantageously make the tubes and header of metal, since by so doing they will be relatively light and strong and occupy only a moderate sized space. One way to make the boiler which possesses many advantages is to utilize tubes that are closed at one end and at the other are attached to the header. Inside of each tube may be placed a second and usually concentric tube that does not extend quite to the closed end of the outer tube so that fluid will flow from one to the other. I may also use a barrier of other form or may dispense with anything inside of the tube for directing circulation. With these arrangements the vacuum-chambered glass jacket or envelop, to be referred to later, can be readily removed or replaced without disturbing any other part. The header which connects the tubes should be placed at such a level or position that it will not shut off the tubes from the sun's rays. The header may, if desired, be arranged to rest on the ground and be suitably packed in heat insulating material to reduce the heat loss to a minimum, or it may be situated above the ground and suitably lagged or insulated.

If desirable, the whole apparatus may be so arranged that the slope of the tubes can be changed to suit changes in the sun's declination, or the tubes may be permanently placed in the best average position. The diameter of the tubes will be varied to suit the conditions of operation. By making the diameter comparatively small and using reflectors or mirrors, suitably placed, to concentrate the radiation on the tubes and reflecting surfaces in the glass envelop to minimize radiation of heat from the tube surface the loss will be relatively less than with large tubes and no reflectors, and the apparatus as a whole will be more efficient. As it will be desirable to use a relatively large number of small vessels instead of a lesser number of comparatively large vessels, the amount of vapor produced in each will be small, and small tubes will be more desirable than large on account of cheapness provided the arrangement is such that by aid of reflectors they intercept most of the energy which would otherwise be lost. The water and steam connections leading to and from the tubes can also be made quite small although proportioned of course to the flow of fluid. By reducing the size of the connections the loss by heat will be diminished. Generally speaking, the diameter, thickness, and length of the tubes will depend upon the pressure at which the boiler is operated, the space necessary for circulation of low pressure steam being greater than that required for high pressure steam.

To reduce the heat losses that would otherwise occur, each vessel is provided with an inclosure, some portion of which at least is transparent to freely admit the rays of the sun. The transparent portion is provided with a vacuum chamber to reduce the radiation, conduction and convection losses of the vessel itself as completely as possible. The vacuum chamber preferably but not necessarily incloses or surrounds the vessel as fully as possible because the more completely the dissipation of heat from the vessel is restricted or retarded, the higher will be the temperature of the vapor which will be practicable without undue loss. The advantage of this will be apparent when it is remembered that the efficiency of a thermodynamic cycle is virtually proportional to the temperature range as before stated. Stated more specifically, each tube or vessel to be heated is inclosed in a glass envelop, the interior of which is evacuated. This envelop is preferably made with double walls whereby the interspace can be sealed by fusion of glass after exhaustion so that the vacuum will remain permanent. Another way of applying the same principle is to use suitably shaped, sealed and exhausted tubes, flattened or circular, as screens to cut off paths by which heat might escape from the heated vessel, and to use other heat insulating material to close spaces by which heat might escape between these tubes.

Since it is difficult to make an air-tight joint or seal between a metal vessel and an outer glass envelop or jacket and one that will not admit air when the parts expand and contract unequally, I make the envelop or vessel in the form of a double-walled inclosure with a suitable space between the walls to form a vacuum chamber. In this manner I avoid the ill effects due to unequal expansion and contraction, and further simplify the construction since the jackets can be separately made and then mounted in place and can be silvered except at the part where rays enter. It further has the advantage that if one jacket is broken it can readily be replaced. Owing to the fact that the liquid is contained in the metal vessel or vessels if one of the jackets is accidentally broken or air leaks into the chamber in the jacket due to a defective seal or otherwise, the operation of the apparatus as a whole is not greatly impaired. The simplest way to make the envelop or jacket is of two glass tubes one located inside of the other and sealed at the ends. Where the tubes are long, supports may be provided at suitable points that extend between the tubes and preserve the desired relation of parts. The outer wall of the jacket is silvered preferably on the inside for a greater part of its circumference so as to reflect back to the walls of the vessel the heat rays which would otherwise be lost. The sun's rays will freely pass through the unsilvered portion which will be located at the top and be of sufficient area to admit all of the rays that can act effectively on the vessel containing liquid to be vaporized. The surface of the outer wall should be so shaped that it will act as a concave mirror so that substantially all the heat radiated from the tube itself will be reflected back upon it by the mirrored surface. A jacket or covering for the vessel when thus formed is an effective heat insulator and will greatly cut off the dissipation of energy from the heated wall of the vessel but at the same time will freely admit radiant energy from the sun. From this it follows that my improved arrangement has the advantage that it makes possible the delivery of energy to a liquid or gas with a correspondingly small energy dissipation even where the temperature of the liquid or gas is very high.

The means described are not only applicable to the making of steam but also to the heating of air or other gases, water or other fluids which may be used for producing power or distributing heat energy.

Since the transparent area in the protecting envelop through which the rays enter must also serve as a path for escape of radiations from the heated vessel, it is desirable to focus the rays with external mirrors so that they can be made to enter a narrow space. By this means the admission of rays is not greatly diminished and the loss by radiation may be materially cut down, and furthermore the size of the heated vessel can be reduced in proportion to the area of sunlight intercepted. Preferably each tube would be provided with two such external mirrors or reflectors, the reflectors for adjacent tubes being properly disposed, as, for example, back to back. In this way I am able to concentrate or focus more of the sun's rays on each of the tubes than would otherwise be possible.

As a further precaution against losses brought about by corroded surfaces, dirt, moisture, etc., the apparatus may be housed in a structure having a glass roof like a greenhouse. Such an arrangement would assist only in confining the heat and may in that way tend to improve the efficiency somewhat in spite of the fact that the glass covering would intercept some of the radiant energy, or glass covers to protect tubes and reflectors from dirt and rain can be attached to the structure itself as shown or in some convenient manner.

In some cases I may so arrange the apparatus that it with its inclosing jackets, mirrors, etc., can be moved to a position for effectively receiving the sunlight. This moving may be accomplished in a variety of ways. It may be done, for example, by a suitable mechanism so arranged that the mirrored or reflecting surfaces are always kept in the most advantageous position with relation to the direction of the sun's rays. This can be accomplished by placing the tubes in a horizontal position and mounting each group on a hinged joint which carries both water and steam by which the whole group with its reflectors can be tipped up and down so that during the hours of use the reflectors can be kept in planes where they best focus the rays. This movement can be controlled by clockwork or by a device actuated by the direction of the rays themselves.

In the accompanying drawings which are illustrative of my invention.

Figure 1:
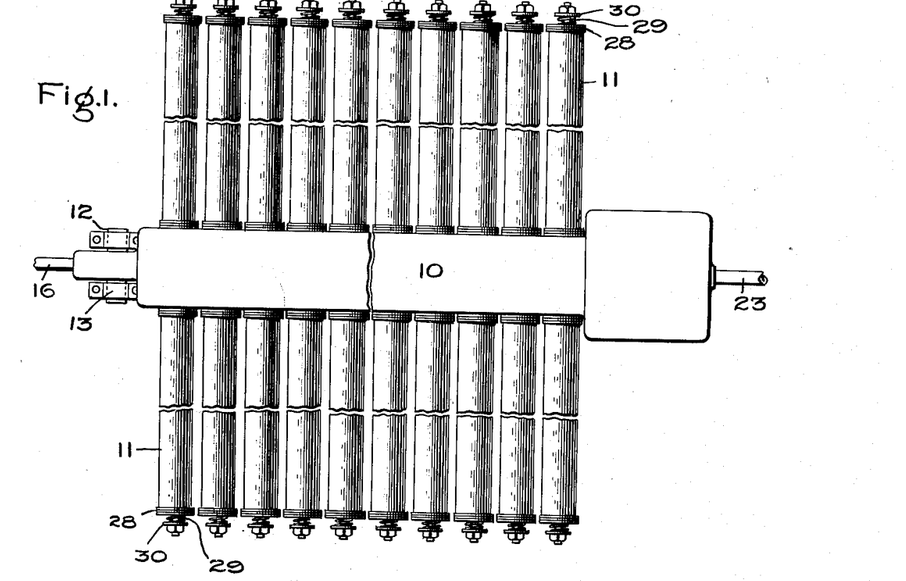
Figure 1 is a plan view of my improved boiler.
Figure 3:
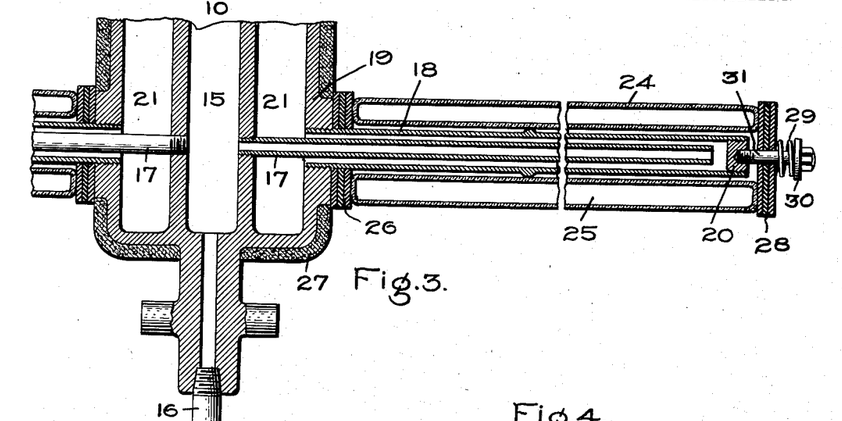
Fig. 3 is a sectional view of one of the tubes and a header connected thereto.

Referring to Fig. 1, 10 indicates a metal header to which the vessels or tubes 11 are connected and arranged to form a grid. The header also forms a support therefor. The lower end of the header is or may be provided with trunnions 12 that are supported in an upright 13 which rests on the ground or other suitable foundation. By raising or lowering the upper end of the grid its inclination with respect to the surface of the earth can be changed to compensate for changes in the direction of the sun's rays. The structure shown, i. e., a screw-jack 14 pivoted at the base, may be taken as typical of any suitable means for raising and lowering the upper end of the grid. The tubes 11 preferably but not necessarily extend both sides of the header so as to simplify the structure and decrease the number of parts and the cost of manufacture. The header is provided with a central longitudinal chamber 15, Fig. 3, to which water or other fluid to be heated is admitted by the pipe 16. To the side walls of the chamber are threaded or otherwise secured metal tubes 17 that are open at both ends. Surrounding each tube is a metal tube 18 that is threaded or otherwise secured to the outer wall 19 of the header. The outer end of the tube is closed by a screw-threaded plug 20 or other means. With this arrangement water or other fluid enters the chamber 15 from the inlet 16 and flows through the inner pipe 17 to the end and then turns and flows through the outer tube 18 back into the chamber 21 which is in communication with the chamber 22 in the header and from which vapor leaves by the outlet 23. Instead of using two tubes, the inner tube can be omitted and some other means, if desired, employed to direct the circulation of the fluid. Each of the tubes is provided with a jacket or envelop 24 some portion of which is made of double-walled, tough, transparent glass, each jacket forming a chamber 25 from which the air has been previously exhausted and a high degree of vacuum attained. The jacket is or may be slipped endwise over the tube and on the inner end rests an asbestos or other washer 26 that forms a cushion to reduce breakage due to expansion and contraction and may also act as a heat insulator. The header is lagged or otherwise covered with good heat insulating material 27. The outer end of each jacket engages one or more asbestos or similar washers 28. These washers are pressed by a spring 29 against the end of the jacket, the spring acting against an adjustable abutment 30 carried by a rod 31 threaded into the plug 20 or otherwise supported. This arrangement will compensate for expansion and contraction. It is to be noted that the conduits admitting fluid to the tubes and conveying it therefrom are separate from and independent of the jacket or its walls. The advantage of this resides in the fact that said conduits do not have to pass through the vacuum chamber, an arrangement that would be costly in the first place and uncertain in practice because of air leaks. It also permits of the jackets being assembled and taken off the tubes without regard to the connections thereof.

Figure 4:
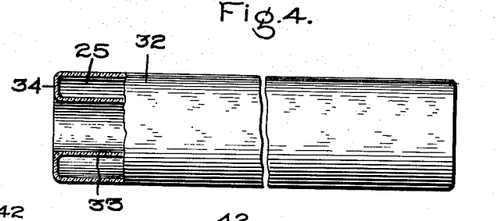
Fig. 4 is a view in side elevation of one of the jackets or envelops.

In Fig. 4 is shown one of the vacuum jackets or envelops. It is composed of an outer tube 32 and an inner concentric tube 33, the diameter of the latter being slightly larger than that of the fluid containing tube 18 to permit of its being readily slipped into place. The ends of the tubes are connected as for example by washer-shaped pieces 34 which are carefully fused to both tubes. The vacuum chamber 25 may be of any suitable shape and size so long as it acts to effectively reduce the dissipation of heat from the metal tubes containing the fluid to be heated. As a general proposition the vessel should be jacketed as completely as possible. The portion containing the vacuum chamber may be made to entirely inclose the fluid-containing vessel or it may inclose or protect a portion thereof, the remainder being protected by a cheaper form of heat insulating material. The shape and size will of course be governed largely by the shape and size of the vessel. It is of great practical value to so construct the vessel and jacket that both can be separately made and the latter mounted in place without having to disturb any connections or any part of the vessel. It is also of great practical value to connect all of the tubes to the same header since it simplifies the construction by decreasing the losses due to radiation, and also reduces the number of parts.

Figure 5:
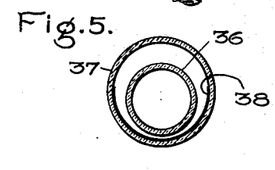
Fig. 5 is a cross-sectional view of a jacket showing its walls eccentrically arranged.

In Fig. 5 is shown an arrangement which possesses certain advantages. In this figure the inner and outer walls 36 and 37 of the jacket are eccentrically disposed, the lower portion of the outer wall being silvered as at 38. The amount of such silvered surface in this and other cases will be governed by the area that is required or desired to admit the sun's rays. The silvering will focus the sun's rays on the contained vessel or tube, and will also reduce the dissipation of heat from the tube by reflecting the heat back upon the vessel or tube.

Figure 6:
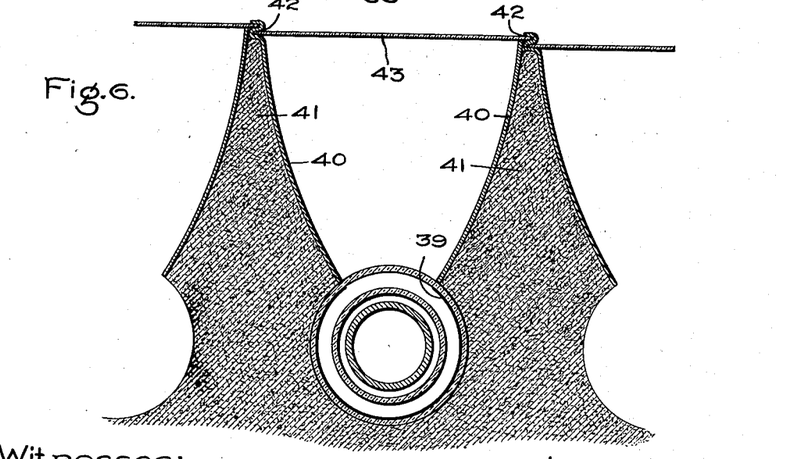
Fig. 6 is a view in cross-section showing reflectors for focusing the sun's rays on the tubes.

In Fig. 6 is shown an arrangement that possesses certain additional advantages. Each tube is inclosed in a vacuum-chambered jacket or envelop and the other wall of the latter is silvered for considerably more of its circumference than those previously described to reduce the dissipation of heat from the fluid containing tube; the heavy black line 39 indicating such silvering. Extending upwardly from the outer wall of each jacket are two reflectors 40 that embrace a larger area than the unsilvered portion of the jacket and which are properly shaped to direct the sun's rays through the clear or unsilvered walls of the jacket and focus them on the tube. The tubes are so spaced apart and the reflectors made of such length that adjacent reflectors when placed back to back will meet in a point at the top where they may be united and will or may rest on the jackets at their lower edges. They may also be attached to the header or otherwise supported. The space between the jackets and that between the reflectors is filled with heat-insulating material 41 to further conserve the heat. The reflectors can advantageously be made of some metal such as Monel that will take a high polish and will not readily corrode. They also have the advantage of being light as they are made of sheet metal, and at the same time are sufficiently strong to maintain their proper shape under all conditions. The upper ends of the reflectors are provided with grooves 42 to receive and support sheets of glass 43, the latter protecting the reflectors and tubes from foreign material, and also preventing the reflectors from tarnishing.

Figure 7:
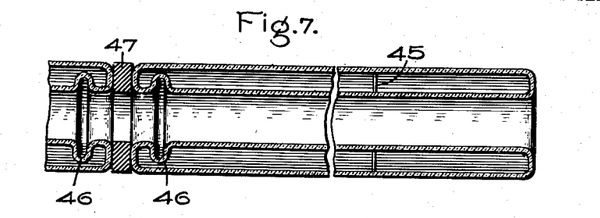
Fig. 7 is a detail view showing a jacket with a means for compensating for expansion.
Figure 8:
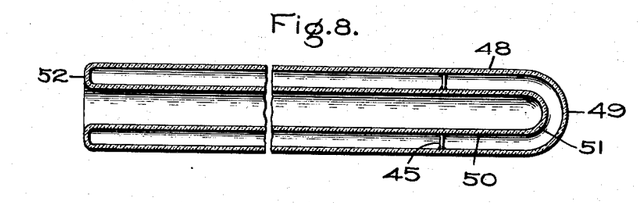
Fig. 8 is a detail view showing a desirable form or construction for a jacket.

In Fig. 7 is shown a form of jacket that is especially useful when long tubes are employed. The jacket is composed of a double-walled structure as before, and the relation of the walls one to the other is maintained by distance pieces or spacers 45 which may be made of any suitable material, such as thin metal for example. These spacers may be employed where the walls of the jacket are concentric or otherwise. The number employed will depend upon the length of the jacket. The spacers will reduce the danger of breakage, and will relieve the inner tube from strains to a greater or less degree. They will also prevent the walls when made thin from collapsing due to the vacuum in the chamber. In those cases where the expansion of the walls of the jackets is unequal and of substantial amount I provide means to compensate for it. In one wall of the tube, usually the inner, is a yielding part of member 46 made by shaping the wall in the form of a U or other cross section. A jacket may be used that covers the entire length of the vessel, or it may be made up in relatively short lengths and mounted on the vessel one after the other, as shown. In the latter case disks of yielding material 47 will preferably be inserted between the ends of adjacent sections or lengths to reduce the danger of breakage. Another way to make the jackets that is especially useful where the expansion of the walls is unequal and also to reduce the cost of manufacture is shown in Fig. 8. The outer wall 48 including the right hand end 49 is made in one piece. The inner wall 50 is made in one piece with the end 51. The opposite end is provided with an integral flange 52 which is united with the left hand end of the outer tube. This results in only one joint in the jacket which is obviously important since it reduces the danger of air leaking into the vacuum chamber. Further since the walls are only united at one end they can freely expand and contract without danger of cracking. The use of spacers 45 in this construction is also desirable to reduce the danger of breakage and relieve the joint at the end of strains occasioned by its own momentum when the jacket is struck or moved rapidly.

Figure 2:
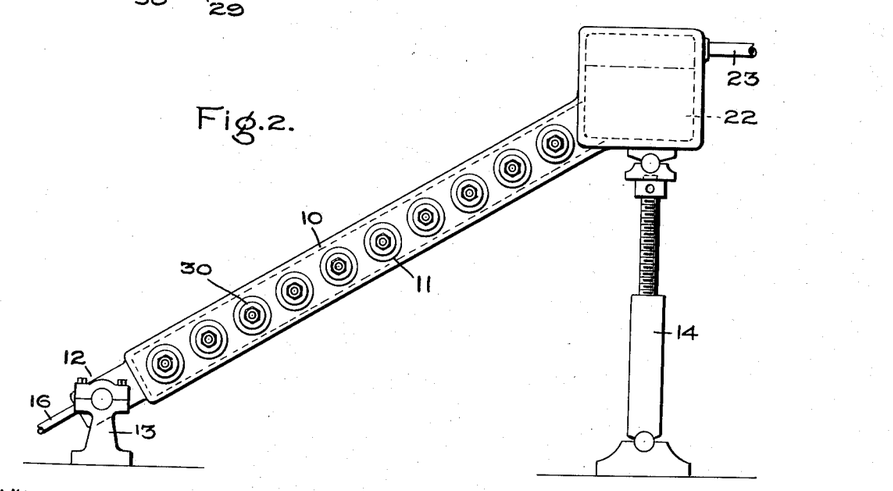
Fig. 2 is a side elevation of the same.
Figure 9:
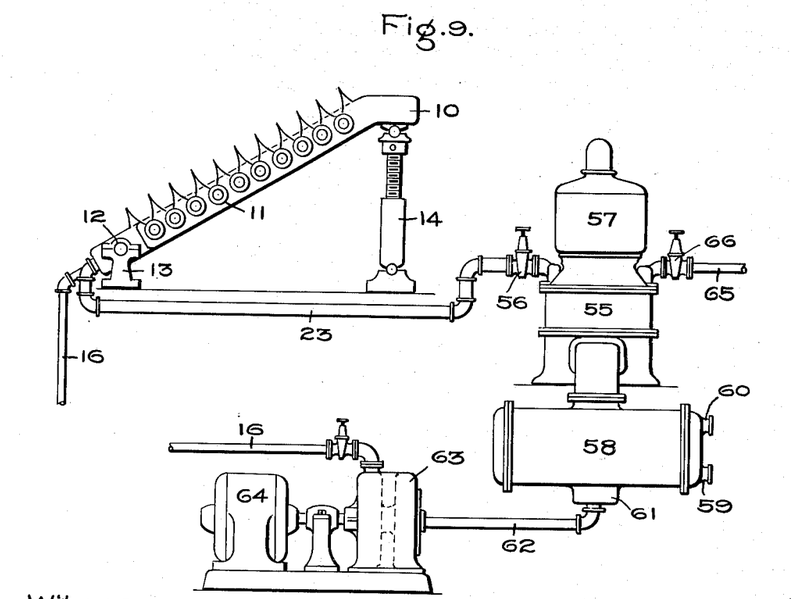
Fig. 9 shows my improved boiler supplying steam to a condensing turbine that is directly connected to an electric generator.

In Fig. 9 a boiler having the general construction of Figs. 1 and 2 is provided which supplies steam to the condensing turbine 55 by the pipe 23. In this pipe is a valve 56 that may be taken as typical of any suitable controlling mechanism for the turbine to vary the admission of steam in accordance with the demand. The turbine drives an electric generator or other load 57. The turbine exhausts into a surface or other condenser 58. Circulating water enters the condenser by the conduit 59 and leaves by the conduit 60. Water of condensation is collected in the hot well 61 and is conveyed by a pipe 62 to a multistage centrifugal pump 63 for increasing its pressure. The pump is driven by an electric or fluid actuated motor 64. The condensation water may and preferably would be supplied to the boiler by the pipe 16. When the supply from the boiler fails or is insufficient, steam from another source, such as a coal fired boiler, may be utilized. For this purpose a conduit 65 is provided that contains a suitable regulator 66.

My invention is particularly useful in connection with condensing turbines although it does not exclude non-condensing engines. The nature of turbines is such that they can effectively use vapor which is worked at low pressure through small ranges of temperature and volume. The use of such low pressure turbines makes possible the use of boiling apparatus which on account of low pressure and low temperature would be useless with engines of the reciprocating type.

Figure 10:
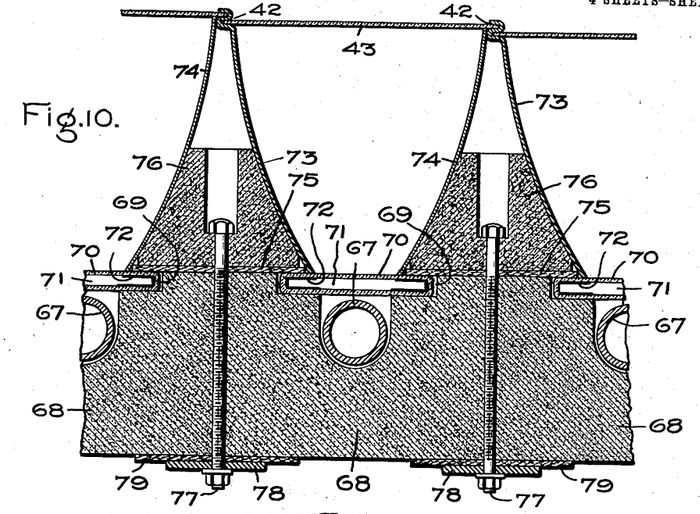
Fig. 10 is a view in cross-section showing a different form of my invention.

In Fig. 10 is shown a further modification of my invention which possesses certain advantages in the nature of reduced initial cost. 67 indicates a fluid containing vessel or tube. Surrounding it on three sides is a body 68 of heat insulating material such, for example, as molded magnesia. This block is made comparatively deep so that the dissipation of heat from the under side of the tube 67 will be restricted. The dissipation of heat from the sides will also be restricted by said material. The upper side of the block is cut away to form a recess 69, and located in this recess is a double-walled glass jacket 70 forming or containing a vacuum chamber 71. The inner walls of the chamber are silvered at 72 to prevent as completely as possible the dissipation of heat from the vessel 67. The portion of the walls directly over the vessel is clear so as to freely admit the direct rays of the sun and also those focused on the vessel by the metal reflectors 73 and 74, the latter being properly shaped to concentrate as fully as possible the rays of the sun directly on the vessel. It will be seen in this figure that the jacket considered as a whole is composed of two portions, i. e., the molded block of insulation 68 and the double-walled glass part, member or element 70. By locating said member in a recess formed in the block 68 it can be slipped into place by an endwise movement, or if the reflectors are removed it can be inserted in place from above. The adjacent blocks abut, and located above the joint between and extending over the side portions of the adjacent members 70 is a layer of felt 75 such as is used for steam pipe covering, or it may be made of asbestos or equivalent material. This material acts as a cushion or pad to reduce the danger of breaking the glass and also to prevent the circulation of air through the joint between the blocks and hence reduce heat losses. Situated above the blocks mentioned and overlapping the joint between is a substantially triangular shaped piece 76 that assists in uniting the blocks and also forms a support for the adjacent walls of the reflector. This piece may be secured in place by bolts 77 that extend through orifices formed partly in one block and partly in the other. The bolts extend through plates 78 and between the plates and the blocks, and covering the joint between said blocks are pieces 79 to prevent air circulation and restrict heat dissipation.

Figures 11, 12, 13:
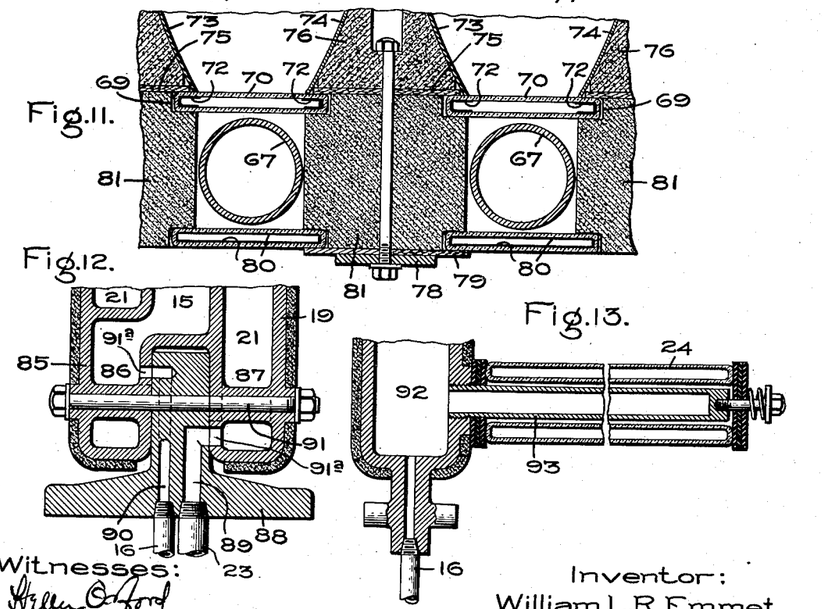
Fig. 11 is a cross-section of still another form.
Fig. 12 is a detail view of a swivel joint for supporting the header with conduit for conveying fluid to and from the chambers therein.
Fig. 13 is a partial sectional view of a modified form of a vessel or boiler.

In Fig. 11 is shown an arrangement somewhat similar to that of Fig. 10, except that two members 70 are employed instead of one. The said members are made in the form of flattened tubes or not as is most convenient in practice or the cheapest or most suitable. The upper member is made as before and has a clear portion directly over the vessel to be heated. The remainder of the walls is silvered as indicated by the heavy black line 72. The lower member is similar in shape to the upper and is entirely silvered as indicated by the heavy black line 80. Since the sun's rays do not pass through the bottom member no clear portion is necessary. On the contrary, it is desired to cut off as completely as possible the dissipation of heat from the vessel, hence the silvering. This arrangement while somewhat more expensive to construct than the one shown in Fig. 10, has certain advantages in the way of reducing the escape of heat, and it also occupies less space. The upper and lower members are held by blocks 81 of insulating material having recesses or shoulders to receive and support said members. The reflectors 73—74 are supported as before.

Referring to Fig. 12, I have shown a typical means whereby the header may be supported at the bottom, and its angle of inclination changed with respect to the surface of the earth. 85 indicates a projection on the base of the header 10 containing passages 86 and 87 that communicate with the chambers 15 and 21 respectively. 88 indicates a base that is affixed to a suitable support. It contains conduits 89 and 90, the latter of which admits water to the passage 86 and the former conveys steam from the passage 87 and its connected chambers. The header and its tubes are arranged to swing about the bolt 91 as an axis. The openings 91ª through the casing walls are made segmental so that fluid can freely flow irrespective of the inclination of the header.

In Fig. 13 is shown a slight modification in the structure of the vessel or boiler. The header 10 is provided with a single chamber 92 that contains both the water and the vapor given up thereby. Extending from the header are tubes or pipes 93 that are closed at their outer ends and at their inner ends open into said chamber. In this case the inner tube or baffler shown in Fig. 3 has been omitted. The tubes or pipes are inclosed in jackets or envelops in the manner heretofore described. Water or other fluid is admitted by the pipe 16 and vapor is discharged by a conduit located at any suitable point.

It will be seen that my invention contemplates either inclosing the fluid containing vessel by means of a vacuum chamber as completely as possible or partially inclosing it by such a chamber, and I aim to embrace such arrangements in my claims. Whether one arrangement or the other is used, or both in the same apparatus will be governed chiefly by the operating conditions and by the cost of manufacture.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is:

1. In an apparatus of the character described, the combination of a fluid-containing vessel that is heated externally by a source of radiant energy, with a jacket therefor which has a transparent portion that freely admits energy from said source and restricts outward loss of heat from the vessel and a reflecting portion for reflecting heat radiated from the vessel back upon it.

2. In an apparatus of the character described, the combination of a fluid-containing vessel that is heated externally by a source of radiant energy, with a jacket therefor that has a vacuum chamber which jacket freely admits energy from said source and restricts outward loss of heat from the vessel.

3. In an apparatus of the character described, the combination of a fluid-containing vessel that is heated externally by a source of radiant energy, a jacket therefor including a double-walled structure containing a vacuum chamber, and means for conveying fluid to and from the vessel.

4. In an apparatus of the character described, the combination of a fluid-containing vessel that is heated externally by the rays of the sun, with a jacket therefor that has a vacuum chamber with a transparent portion through which said rays pass and act on the vessel.

5. In an apparatus of the character described, the combination of a fluid-containing vessel that is heated externally by the rays of the sun, with a jacket therefor that has a vacuum chamber with a transparent portion through which said rays pass and act on the vessel, and a reflecting surface for the jacket to reduce dissipation of heat from the vessel, the said reflector being located within the vacuum chamber.

6. In an apparatus of the character described, the combination of a metal-walled, fluid-containing vessel that is heated externally by a source of radiant energy, with a double walled jacket therefor, which forms a vacuum chamber, a portion of which is transparent.

7. In an apparatus of the character described, the combination of a fluid-containing vessel that is heated externally by a soure of radiant energy, a jacket for the vessel which forms a vacuum chamber and has a transparent portion to permit said energy to pass through it, and a means for reflecting the heat radiating from said vessel back upon it.

8. In an apparatus of the character described, the combination of a fluid-containing vessel that is heated externally by a source of radiant energy, a double-walled, transparent jacket for the vessel that forms a vacuum chamber, and a reflector which reflects the heat radiation from said vessel back upon it.

9. In an apparatus of the character described, the combination of a fluid-containing vessel that is heated externally by a source of radiant energy, a double-walled glass jacket for the vessel that forms a vacuum chamber, and a reflecting surface in the vacuum chamber that surrounds a portion only of the vessel and reflects heat radiating from said portion back upon the vessel.

10. In an apparatus of the character described, the combination of a fluid-containing vessel that is heated externally by a source of radiant energy, and a glass jacket for the vessel that forms a vacuum chamber, the outer wall of said jacket being silvered on the inside surface except where the radiant energy enters.

11. In an apparatus of the character described, the combination of a fluid-containing vessel that is heated externally by a source of radiant energy, a jacket for the vessel that forms a vacuum chamber and has a transparent portion to permit said energy to pass through it, a reflector for directing the rays from said source against the vessel, and means for conveying fluid to and from the vessel.

12. In an apparatus of the character described, the combination of a vessel that is heated externally by the rays of the sun, a jacket for the vessel that forms a vacuum chamber and has a transparent portion to permit said rays to pass through it, a reflector for focusing rays of the sun on the vessel, and a reflecting surface in the vacuum chamber for reflecting the heat radiating from the vessel back upon it.

13. In an apparatus of the character described, the combination of a vessel that is heated externally by a source of radiant energy, a jacket therefor which forms a vacuum chamber and has a transparent portion to admit said radiant energy, and means separate from and independent of the jacket for conveying the fluid to be heated to and from the vessel.

14. In an apparatus of the character described, the combination of a vessel that is heated externally by a source of radiant energy, a double-walled glass jacket therefor that forms a chamber from which the air is exhausted, a conduit admitting fluid to the vessel to be heated, and a second conduit for carrying heated fluid from the vessel, the said conduits being separate from and independent of the walls of said jacket.

15. In an apparatus of the character described, the combination of a metal-walled vessel that contains fluid and is heated externally by solar heat, a double-walled jacket for the vessel which forms a vacuum chamber and has a transparent portion, and a reflector that is made by silvering one of the walls of the jacket.

16. In an apparatus of the character described, the combination of a cylindrical vessel that contains fluid and is heated externally by solar heat, a jacket therefor, comprising transparent tubular members located one inside of the other and forming a vacuum chamber, and means for conveying fluid to and from the vessel.

17. In an apparatus of the character described, the combination of a plurality of fluid-containing vessels that extend in the same general direction and are heated externally by a source of radiant energy, a support that is common thereto, and an independent jacket for each vessel which forms a vacuum chamber, said jackets freely admitting energy from said source and restricting the outward loss of heat from the vessel.

18. In an apparatus of the character described, the combination of a plurality of fluid-containing tubes that are heated externally by a source of radiant energy, a header that is common thereto, jackets for the tubes, each of which forms a vacuum chamber and freely admits energy from said source but restricts the outward loss of heat from the tubes, and conduits for conveying fluid to and from the header.

19. In an apparatus of the character described, the combination of a plurality of fluid-containing tubes, a cylindrical jacket for each tube which is slipped over it from one end, the said jacket forming a vacuum chamber, a chambered header to which the tubes are connected at one end, and conduits conveying fluid to and from the chambers in the header.

20. In an apparatus of the character described, the combination of a plurality of tubes arranged to form a grid, and which are heated externally by a source of solar radiation, jackets for the tubes, each composed of transparent material and forming a vacuum chamber, reflecting surfaces which reflect the radiation from the tubes back upon them, and other reflectors which focus the radiation from the source upon the tubes.

21. In an apparatus of the character described, the combination of a header, a plurality of parallel tubes that extend from one side thereof and are heated externally by solar radiation, a jacket for each tube forming a vacuum chamber, a reflecting surface carried by each jacket for reflecting the radiation from its contained tube back upon it, and metallic reflectors mounted above the tubes for focusing the solar radiation upon them.

22. In an apparatus of the character described, the combination of a vessel that is heated externally by a source of solar radiation, a jacket therefor that comprises a double walled structure forming a vacuum chamber and has a transparent portion, a reflecting surface that incloses a portion only of the vessel and focuses radiation from said source and also that from the vessel upon said vessel.

23. In an apparatus of the character described, the combination of a vessel that is heated externally by a source of solar radiation, a jacket therefor comprising a double-walled glass structure forming a vacuum chamber, and a yielding means which permits the parts to expand and contract without breaking the jacket.

24. In an apparatus of the character described, the combination of a metal tube that is heated externally by the sun's rays, a double-walled tubular glass jacket therefor which forms a vacuum chamber and is slipped on endwise over the tube, and a yielding means at one end of the jacket to permit the glass to expand and contract without breaking.

25. In an apparatus of the character described, the combination of a metal tube that is heated externally by the sun's rays, a double-walled tubular glass jacket therefor which contains a vacuum chamber and is slipped on endwise over the tube, a fixed abutment carried by the tube, and a yielding means between the abutment and one end of the glass jacket.

26. In an apparatus of the character described, the combination of a vessel, a jacket therefor comprising glass cylinders located one within the other and closed at the ends and containing a vacuum chamber, and a device to permit of expansion and contraction formed in one of said cylinders.

27. In an apparatus of the character described, the combination of a fluid-containing vessel that is heated by the sun's rays with a jacket for the vessel comprising glass tubes located one within the other and separated by a space from which the air has been exhausted, the said tubes being united at one end.

28. In an apparatus of the character described, the combination of a fluid-containing vessel that is heated externally by the sun's rays, with a jacket therefor comprising glass tubes, one within the other and separated by a space to form a chamber from which the air is exhausted, and means for supporting the inner tube within the outer.

29. In a power system, the combination of a fluid-containing vessel that is heated externally by the rays of the sun, a jacket therefor forming a vacuum chamber and having a transparent portion, reflecting surfaces for focusing the rays of the sun on the vessel, other reflecting surfaces for focusing the radiation from the vessel upon it, and conduits for conveying liquid to the vessel and vapor from it.

30. In an apparatus of the character described, the combination of a fluid-containing vessel that is heated by the rays of the sun, means within the vessel for directing the circulation of fluid therein, and a jacket for the vessel to reduce the dissipation of heat which has a vacuum chamber and a transparent portion to enable said rays to act on the vessel.

31. In an apparatus of the character described, the combination of a plurality of separate units that contain fluid and are adapted to be heated externally by the rays of the sun, a chambered support to which the said units are connected, and jackets for the units to reduce dissipation of heat, each of which has a vacuum chamber and a transparent portion to enable the said rays to act on the vessel.

32. In an apparatus of the character described, the combination of a plurality of units that contain fluid and are adapted to be heated by the rays of the sun, a header to which the units are attached, a hinged support for the header, conduits for conveying fluid to and from the header through said support, and jackets for the units to reduce the dissipation of heat therefrom, each of which has a vacuum chamber.

In witness whereof, I have hereunto set my hand this 29 day of May, 1909.

WILLIAM L. R. EMMET.

Witnesses:
ALEX. F. MACDONALD,
BENJAMIN B. HULL.